United States Patent [19]

Nelson et al.

[11] B 3,996,615
[45] Dec. 7, 1976

[54] ROTARY AIR BEARING HEAD WITH LEADING EDGE CONTROLLING AIR BEARING

[75] Inventors: George N. Nelson, Milpitas; Frank E. Talke, Los Gatos; Raymond C. Tseng, San Jose, all of Calif.

[73] Assignee: International Business Machines Corporation, Armonk, N.Y.

[22] Filed: Apr. 8, 1974

[21] Appl. No.: 458,964

[44] Published under the second Trial Voluntary Protest Program on March 2, 1976 as document No. B 458,964.

[52] U.S. Cl. .............................................. 360/102
[51] Int. Cl.² .................. G11B 5/60; G11B 21/20; G11B 15/64
[58] Field of Search ............................. 360/102, 84

[56] References Cited

UNITED STATES PATENTS

| | | | |
|---|---|---|---|
| 3,404,241 | 10/1968 | Streets et al. | 360/102 |
| 3,416,148 | 12/1968 | Berghaus et al. | 360/102 |
| 3,504,136 | 3/1970 | Maxey | 360/102 |
| 3,510,604 | 5/1970 | Kell | 360/102 |
| 3,512,145 | 5/1970 | Gabor | 360/102 |
| 3,614,338 | 10/1971 | Emmasingel | 360/102 |
| 3,725,606 | 4/1973 | Thompson | 179/100.2 |
| 3,821,813 | 6/1974 | Freeman et al. | 360/102 |

*Primary Examiner*—Robert S. Tupper
*Attorney, Agent, or Firm*—Nathan N. Kallman

[57] ABSTRACT

In a helical drive tape apparatus, a rotary head drum is disposed between two sections of a split cylindrical mandrel about which a magnetic tape is guided. The head drum supports at least one magnetic transducer at its periphery, so that the total diameter of the head drum and projecting transducer is greater than the diameter of the adjacent mandrel sections. The projecting transducer has a spherical contoured portion and is configured at its leading edge, relative to the moving tape, to form an air bearing between the head and the tape. The spherical contoured portion and configured leading edge both project beyond the outer surface of the mandrel relative to the tape.

12 Claims, 4 Drawing Figures

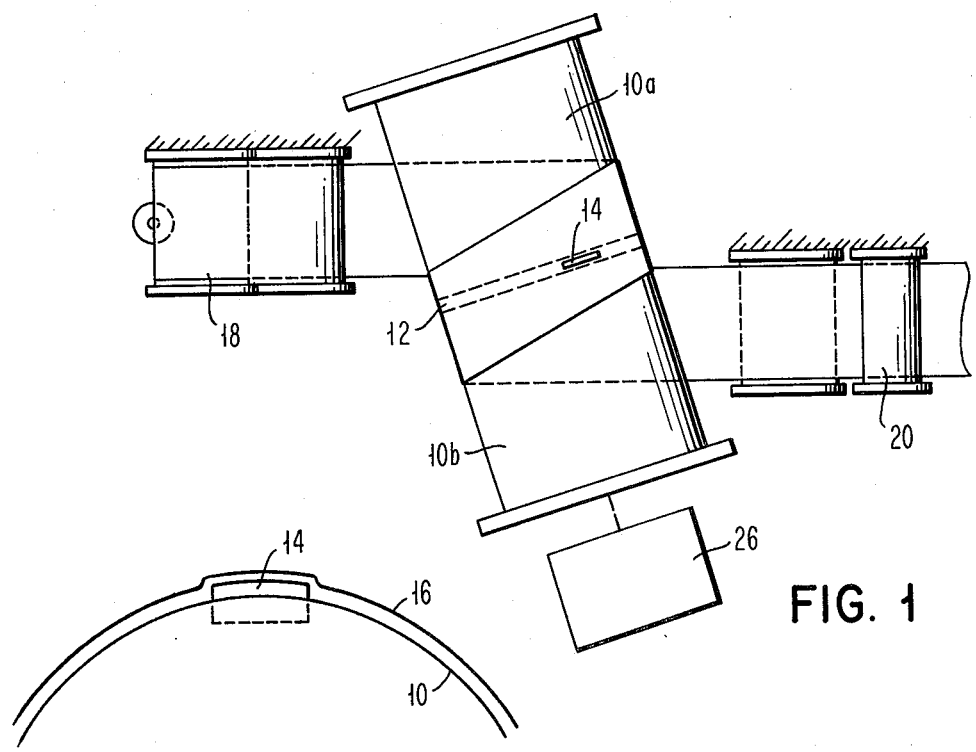
FIG. 1
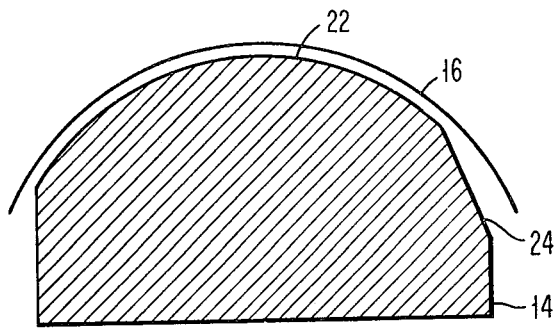
FIG. 2
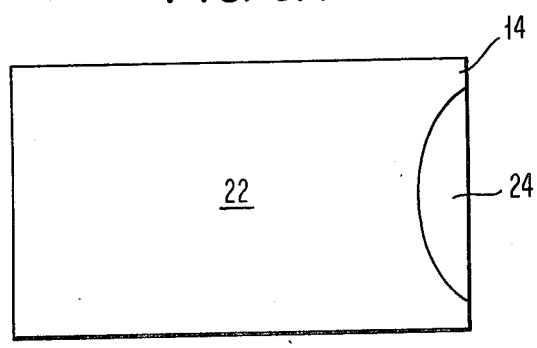
FIG. 3A
FIG. 3B

ROTARY AIR BEARING HEAD WITH LEADING EDGE CONTROLLING AIR BEARING

BACKGROUND OF THE INVENTION

1. Field of the Invention

This invention relates to a novel rotary head assembly, and in particular to a rotary head assembly that may be employed in a helical drive tape apparatus to provide a self-generated air bearing.

2. Description of the Prior Art

Magnetic tape recorders incorporating rotary head assemblies have been used extensively, as in videotape recording, for example. In recorders of this type the rotary head assembly scans across the moving tape, i.e., transversely or obliquely. U.S. Pat. No. 3,571,500 illustrates one example of such a video recorder. Conventionally, the magnetic heads are in intimate contact with the moving tape, which results in undue wear of the heads and the tape. Therefore, noncontact transport of the tape relative to the head would be desirable. To achieve noncontact operation, it is known to separate the tape and the head by a film of air that may be created by application of compressed air.

In some magnetic recording systems, such as magnetic disk drives, self-generated air bearing heads are employed, i.e. each head flies relative to the rigid flat rotating disks.

By analogy to rigid disks, it would also be highly advantageous to have a tape recording apparatus, wherein a self-acting air bearing is formed between a rotating head and a moving flexible tape, and wherein the spacing between the head and tape is maintained substantially uniform and very close, thereby realizing high signal density and improved resolution.

SUMMARY OF THE INVENTION

An object of this invention is to provide a tape recording apparatus, employing a rotary head assembly with a self-generated air bearing formed between the moving tape and rotating head.

Another object of the invention is to provide a tape recorder wherein an air bearing is formed by virtue of the relative motion between the tape and the magnetic head, without the need of an external pressure source.

Another object is to provide a head transducer configuration for a rotary head assembly that allows fine control of head-to-tape spacing.

In an embodiment of this invention, a recording apparatus incorporates a split cylindrical mandrel having two spaced sections for guiding a magnetic tape in a helical path. A rotary head drum or rotor is disposed in the space between the sections and is coaxially aligned with the mandrel. At least one magnetic transducer is mounted at the periphery of the head drum, so that its projecting tip which includes the transducing gap is at a radial distance from the center axis of the drum greater than the radial distance of the outer surface of the mandrel from its central cylindrical axis. The magnetic transducer has a spherical contour that encompasses the transducing gap, and a configured leading edge portion superimposed thereon, which may be tapered or spherical by way of example. When the rotary head drum is rotating adjacent to the moving tape, a convergent air channel is formed between the configured leading edge portion of the head and the tape, thereby effectively creating an air bearing therebetween. The size, width and shape of the configured leading edge portion, and the radius of the spherical contoured portion of the head determine the characteristic of the air pressure established between the tape and the head, and thus determine the head-to-tape spacing.

BRIEF DESCRIPTION OF THE DRAWING

The invention will be described in greater detail with reference to the drawing in which:

FIG. 1 is a schematic plan view of a helical drive tape recording system, in accordance with this invention;

FIG. 2 is an enlarged partial side view representing the relationship between a guide mandrel, magnetic tape, and magnetic transducer, as employed with this invention;

FIGS. 3A and 3B are cutaway schematic side and top views respectively, of a tapered leading edge, spherical contour head as employed with the present invention.

DESCRIPTION OF THE PREFERRED EMBODIMENT

With reference to FIG. 1, a rotary head magnetic recording apparatus includes a split mandrel 10 having sections 10a and 10b and a rotary head drum 12 that is located in the gap between the split mandrel sections. One or more magnetic read/write transducers 14 are mounted on the periphery of the rotary drum. The transducers may each have a single transducing gap for read/write and/or erase; or each may have a multiplicity of gaps for independent read, write or erase. Transformers (not shown) are mounted on the head drum to couple the write and read signals to and from the magnetic transducers. A magnetic tape 16 is transported from a supply reel 18 and guided in a helical path around the mandrel sections 10 to a take-up reel 20. Preferably, the tape 16 is wrapped under tension around the mandrel through 360°. Drive means 26 is provided to rotate the head drum, and the tape is moved by a capstan, or other well known means.

In accordance with this invention, the transducer 14 is preferably made with a spherical contour portion 22, which encompasses the transducing gap, and a configured portion 24 disposed at the leading edge facing the oncoming tape. The configured portion 24 may be a tapered configuration, as illustrated in FIG. 3, or alternatively a spherical configuration, by way of example, superimposed on the central spherical contour 22. The transducing gap portion of the magnetic head 14 projects from the periphery of the drum 12 so that the total radial length consisting of the radius of the head drum plus the radial length of the extending spherical contour portion 22 of the transducer 14, is greater than that of the mandrel sections 10A,B, as illustrated in FIG. 2. In particular, the leading edge of the magnetic transducer 14 extends beyond the outer surfaces of the mandrel sections. During static conditions, the leading edge protrudes into the tape. However, when the head drum is rotated and the tape is longitudinally transported around the guide mandrel, the tape and transducer are separated and a constant uniform spacing is established.

During operation of the tape apparatus, as the head drum 12 and the magnetic transducer 14 rotate adjacent to the moving tape 16, air is drawn between the magnetic transducer and the tape. The amount of air is dependent on the size, width and angle of the taper that defines the configured portion 24 of the magnetic head. When more than one magnetic transducer is used about the periphery of the drum 12, each transducer assembly contributes to creating its own air bearing with the tape as it traverses the tape.

The self-generated air flow established by virtue of the contoured and configured magnetic head causes the tape to lift away from the head, thereby providing a head-to-tape spacing of close dimension. It has been found that the air bearing formed between a helically driven tape, and a rotating magnetic head with this novel spherical contour with configured leading edge configuration is very uniform, and can extend over a relatively large region of the head surface. By virtue of the large air bearing established between the head and the tape, misalignment and manufacturing tolerances are not critical for the novel head design of this invention.

It has been determined that the flying height is dependent on the taper angle and the width and size of the taper configuration. When using a tapered spherical head, the angle of the taper as well as its other dimensions may apparently be modified during manufacture. Since the flying height is a function of the taper angle, the spacing between the head and the tape may be controlled by the design of the magnetic head. By means of the configured head such as described above, flying heights in the range from 5 to 100 microinches have been obtained in a rotary head magnetic tape recording apparatus. Once established, the flying height remains uniform and constant during operation.

The taper portion of the transducer may be formed by burnishing with an abrasive tape, for example. It has been found that the taper angle can be controller to within $\mp 0.1°$, and thus flying height variation is limited to $\mp 1$ microinch.

It should be understood that the scope of the invention is not limited to the particular configuration and parameters delineated above. For example, although the embodiment described shows a spherical contour head, other heads having face contours with cross-curvatures in intersecting directions, such as ellipsoidal shapes, may be used within the scope of this invention. The leading edge configuration need not be tapered or spherical, but may assume other shapes to achieve the convergent air flow and self-generated air bearing in the vicinity of the transducer gap.

What is claimed is:

1. A rotary magnetic head assembly for use in a rotary head magnetic tape recorder of the self acting air bearing type, which recorder includes a cylindrical tape mandrel with two sections defining a gap,
    said rotary magnetic head assembly comprising:
    a rotary drum for coaxial disposition within the gap of such a mandrel;
    a magnetic head attached to said drum, said head including a right sided base portion and a doubly convex crown portion, symmetrical about an axial plane of said drum, whose curvatures are of the same order as that of said rotary drum and which has a transducing gap therein, said crown portion being substantially coterminous with said base portion so as to provide an air bearing surface for said head;
    said head further including a leading edge region between said base and crown portions, said leading edge region being configured to be relatively flatter and of substantially smaller area than said crown portion and with an angle of attack intermediate those of the adjacent crown and base portions, said leading edge region and crown portion projecting entirely beyond the periphery of said mandrel, whereby upon rotation of said drum an air bearing is provided for a tape of a uniform thickness between 5 and 100 microinches over substantially the whole length of said crown portion.

2. A rotary magnetic head assembly as in claim 1, wherein said crown portion of said head is spherical.

3. A rotary magnetic head assembly as in claim 1 wherein said configured leading edge region is flat bevelled.

4. A rotary magnetic head assembly as in claim 1, wherein said right sided base portion is a rectangular parallelepiped.

5. A rotary head magnetic tape recorder of the self-acting air bearing type comprising:
    a cylindrical tape mandrel formed with two sections defining a gap;
    a rotary head drum disposed within said gap coaxially with said mandrel;
    at least one magnetic head mounted at the periphery of said drum;
    said head including a right sided base portion and a doubly convex crown portion, symmetrical about an axial plane of said drum, whose curvatures are of the same order as that of said mandrel and which has a transducing gap therein, said crown portion being substantially coterminous with said base portion so as to provide an air bearing surface for said head;
    said head further including a leading edge region between said base and crown portions, said leading edge region being configured to be relatively flatter and of substantially smaller area than said crown portion and with an angle of attack intermediate those of the adjacent crown and base portions, said leading edge region and crown portion projecting entirely beyond the periphery of said mandrel, whereby upon rotation of said drum an air bearing is provided for a tape of a uniform thickness between 5 and 100 microinches over substantially the whole length of said crown portion.

6. A rotary magnetic tape recorder as in claim 5 wherein said configured leading edge region is flat bevelled.

7. A rotary head magnetic tape recorder as in claim 5, further including a magnetic tape that is wound about said mandrel.

8. A rotary head magnetic tape recorder as in claim 5, wherein said tape is wound about said mandrel for about 360° under tension.

9. A rotary head magnetic tape recorder as in claim 5, including means for moving said tape and for rotating said head drum, so that a convergent air channel and a self-generated air bearing is formed between said head and said tape.

10. A rotary head magnetic tape recorder as in claim 5, wherein said magnetic head includes a plurality of transducing gaps.

11. A rotary head magnetic tape recorder as in claim 5 wherein said crown portion of said head is spherical.

12. A rotary head magnetic tape recorder as in claim 5 wherein said right sided base portion is a rectangular parallelepiped.

* * * * *